Patented Aug. 12, 1952

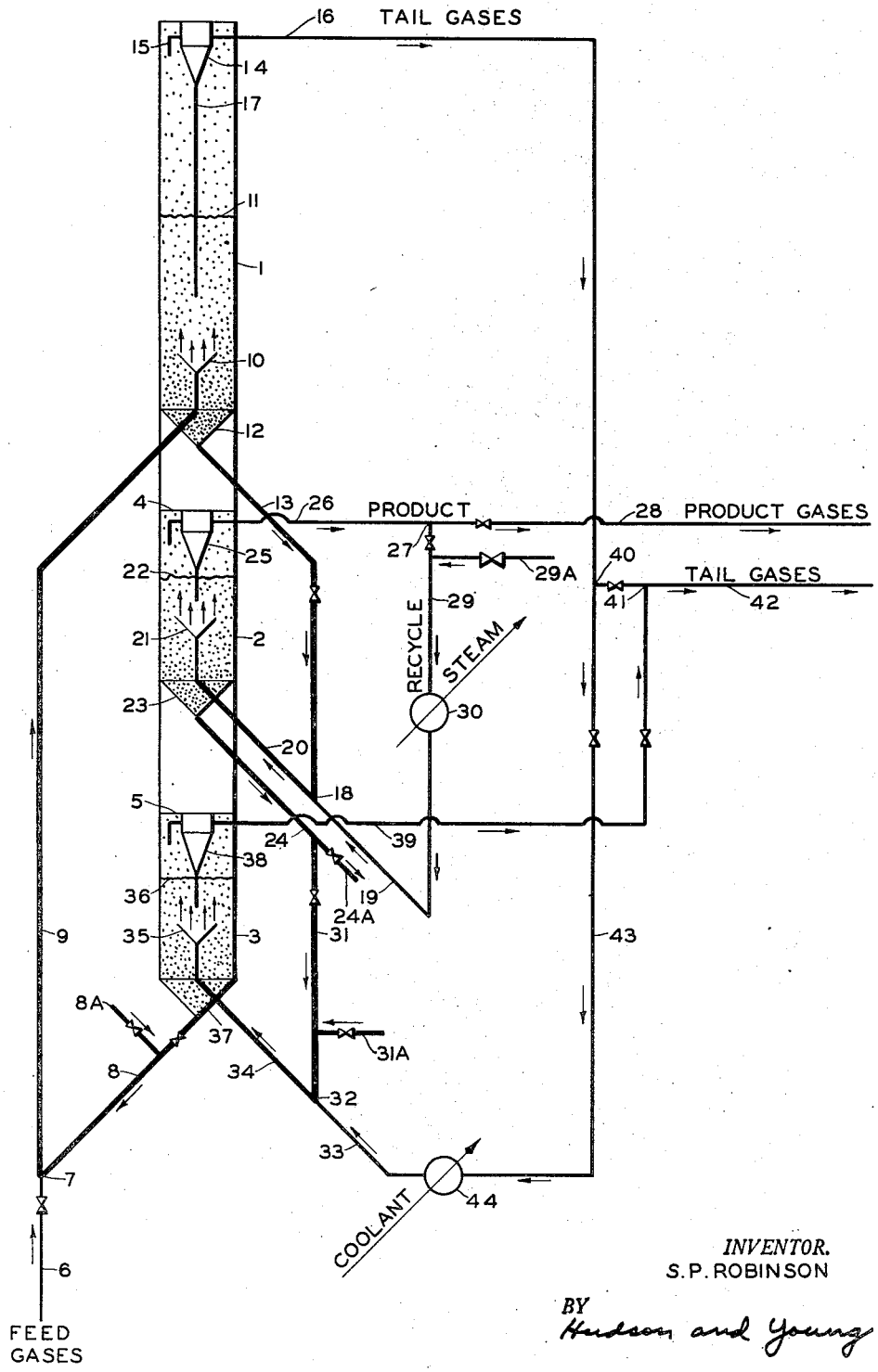

2,606,938

UNITED STATES PATENT OFFICE 2,606,938

CONTINUOUS SEPARATION OF HYDROCARBONS WITH CUPROUS HALIDE ABSORBENTS

Sam P. Robinson, Bartlesville, Okla., assignor to Phillips Petroleum Company, a corporation of Delaware Application July 6, 1948, Serial No. 37,168

9 Claims. (Cl. 260—681.5)

This invention relates to a process and apparatus for separating a gaseous mixture into two fractions by a sequence of steps involving absorption of one fraction on a finely divided solid absorbent followed by stripping of the absorbed fraction in a separate zone. This invention is a continuation-in-part of my copending application, Serial No. 710,468, filed November 18, 1946, now Patent No. 2,527,964.

I. Louis Wolk in Patent No. 2,386,734 discloses a process wherein diolefins are separated from mixtures containing more saturated hydrocarbons by absorbing the diolefins with cuprous halides in a fluidized state. The absorbed diolefin is stripped from the absorbent with a heated inert gas. The stripped absorbent is cooled with an inert gas and recycled back to the absorption step. My present invention is an improvement over Wolk's process in that the absorbed unsaturated hydrocarbon is desorbed by a heated stream of product gas and the absorbent to be recycled to the absorption step is cooled by a recycle stream of unabsorbed tail gas. The many improvements over the prior art will become apparent from the accompanying disclosure.

The principal object of the present invention is to provide an improved absorption process for separating gases into several fractions. Another object is to provide such a process wherein far greater utilization of the absorbent is attained than has heretofore been known. Another object is to effect great savings in initial construction costs and in operation of such a separation system. Another object is to effect improved absorption, stripping and cooling of solid absorbent in a process of the foregoing type. Another object is to effect the cooling of the stripped absorbent in a superior manner preparatory to recycling the absorbent to the absorption step. Another object is to effect stripping of the rich absorbent in an improved manner. Further objects and advantages of my invention will become apparent to one skilled in the art, from the accompanying disclosure and discussion.

The accompanying drawing portrays diagrammatically in vertical longitudinal section one arrangement of equipment which is highly preferred for carrying out the present invention.

In one process aspect the present invention accomplishes separation of a gaseous mixture into two fractions by suspending a finely divided solid absorbent in the mixture to be resolved under conditions such as to effect absorption of the desired fraction of the mixture by the absorbent, separating the resulting absorbent from the unabsorbed fraction, or tail gas, suspending the rich absorbent in a heated recycle stream of stripped product gas under conditions such as to effect desorption of the absorbed fraction from the absorbent as a result of the heat derived from the hot recycle product gas, separating the resulting stripped absorbent from the stripping and desorbed product gas, suspending the resulting stripped absorbent in a cooled recycle stream of the unabsorbed or tail gas under conditions such as to effect cooling of the absorbent to a temperature suitable for its reintroduction to the absorbing step, separating the resulting cooled absorbent from the resulting tail gas, and recycling the cooled absorbent to the first-named suspending step.

My invention is based not only on the discovery that markedly improved results can be obtained by suspending a finely divided solid absorbent in the feed gas, the stripping gas and the cooling gas in the absorbing, stripping and cooling zones, respectively, but also on the discovery that much improved results can be obtained by heating a portion of the absorbed or product gas and employing this for stripping and by cooling a portion of the unabsorbed or tail gas and using the thus cooled tail gas for cooling the absorbent to remove the heat imparted thereto in the stripping operation.

One feature of the present process is that the finely divided solid absorbent is suspended in the feed gas under conditions such as to effect the desired absorption, and the resulting rich absorbent, after separation from the unabsorbed gas in any suitable manner, is desorbed by suspending it in a heated recycle stream of stripped product gas. This feature of my invention is highly advantageous because contamination of the absorbent or of the desorbed product with the heated stripping medium is completely avoided since the heated stripping medium is itself a portion of the desorbed product gas. In addition heat transfer is nearly perfect as compared to the poor heat transfer obtained when indirect means of heating the solid absorbent, such as coils located in the bed of absorbent, are employed in accordance with prior practice.

As another feature of the present process the finely divided solid absorbent is suspended in the feed gas under conditions effecting absorption of the desired fraction of the feed gas by the absorbent followed by stripping of the separated absorbent and the hot stripped absorbent is cooled by suspending it in a cooled recycle stream of tail gas, thereby effecting cooling of the absorbent to a temperature suitable for recycle to the absorption step. This feature also is highly advantageous over the customary methods of cooling the hot stripped absorbent before re-introducing the same to the absorption step. One advantage is that the tail gas is readily available being made continuously by the process. Furthermore the absorbent is not contaminated by an extraneous gaseous medium as would be the case were such an extraneous medium employed instead of tail gas for direct contact cooling of the absorbent. Cooling the tail gas before suspension of the hot finely divided absorbent therein and passage of the resulting suspension into the cooling zone is advantageous, among other reasons, because erosion of the cooler or heat exchanger is eliminated, whereas if the absorbent were suspended in the stream of recycled tail gas and the resulting suspension passed through a heat exchanger or cooler, erosion would be a serious problem. Furthermore heat transfer between the cooled gas and the finely divided solid absorbent suspended therein is very good as compared with the poor heat transfer obtained when cooling coils or other indirect cooling means are employed.

The process of my invention is preferably carried out in the following manner. The finely divided solid absorbent is suspended in a stream of the gaseous mixture employed as feed and the resulting suspension is introduced upwardly into the absorbing zone. Conditions in the absorbing zone are maintained such as to effect absorption of the desired component or components of the feed by the absorbent. The rich absorbent is allowed to settle to the bottom of the absorbing zone and is withdrawn therefrom in the form of a relatively compact mass. Tail gas free from absorbent is withdrawn from the upper portion of the zone. The withdrawn rich absorbent is suspended in a heated recycle stream of stripped product gas and the resulting suspension is introduced upwardly into the stripping zone where conditions are maintained such as to effect desorption of the absorbed fraction and allow the resulting stripped absorbent to settle to the bottom of the zone. The resulting gas is withdrawn in a condition free from absorbent from the upper portion of the stripping zone. This gas has a composition identical with the absorbed fraction and is made up of the absorbed fraction and the recycled product gas employed for stripping. The gas withdrawn from the top of the stripping zone is split into two streams one of which is a product stream withdrawn from the system at a rate equal to that at which the product is entering the system in the form of feed gas and the second of which is a recycle stream which is heated and employed as the stripping medium in the stripping zone.

Stripped absorbent is withdrawn from the bottom of the stripping zone as a relatively compact mass and is suspended in a cooled recycle stream of tail gas. Tail gas withdrawn from the absorption zone is split into two streams, namely, a stream which is withdrawn from the system at a rate equal to that at which the tail gas fraction enters in the feed, and a recycle stream which is cooled and used to effect cooling of the hot stripped absorbent. The resulting suspension of stripped absorbent in cooled recycle tail gas is introduced upwardly into the cooling zone, where conditions are maintained such as to effect cooling of the absorbent to the temperature at which it is desired to reintroduce it into the absorbing zone. The resulting cooled absorbent is caused to settle to the bottom of the cooling zone and is withdrawn as a relatively compact mass from said zone. The thus cooled absorbent is recycled to the absorbing step. The recycle gas is withdrawn from the upper portion of the cooling zone and this stream of tail gas, so withdrawn, may conveniently be merged with the aforesaid stream of tail gas withdrawn from the system.

As will presently appear more fully, I prefer to maintain a light gaseous phase containing a relatively low proportion of absorbent in the upper portion of each of the three zones, and a dense phase containing a relatively high proportion of absorbent below the light phase in each zone, and to effect what is known as hindered settling in the dense phase in each zone. These results are preferably effected by correlating the velocity upwardly through each zone and the weight and size of the absorbent particles.

My preferred absorbent is cuprous chloride, but any cuprous halide, mixtures of cuprous halides, or other unsaturated hydrocarbon complex-forming metal salt of the heavy metals of groups 1 and 11 of the periodic system will work. The absorbent must have the property of forming an unsaturated hydrocarbon complex with the metal salt absorbent so as to make it possible to selectively absorb the unsaturated hydrocarbon. The absorbent may be used alone in finely divided solid form or it may be deposited on an inert support such as bauxite, asbestos, fuller's earth, silica gel, pumice, charcoal, or the like. Schulze and Morris in Patent No. 2,386,358 disclose methods of preparing supported absorbents which would be suitable to prepare absorbents to use in my process. For example, a 20 to 60 mesh bauxite in a closed kettle is sprayed with a hot water solution of cupric chloride containing about 8 pounds of cupric chloride per gallon. The bauxite is stirred constantly while the cupric chloride solution is being added. The cupric chloride solution is added until the bauxite is thoroughly moistened; at which time the reagent mixture will be about 55 per cent cupric chloride. The cupric chloride deposited on the bauxite is then reduced to cuprous chloride by passing sulfur dioxide gas or ethyl mercaptan gas through the wet agitated bauxite. The absorbent comprising cuprous chloride deposited on bauxite is dried and kept out of contact with oxidizing materials such as $O_2$ or air. One skilled in the art will have no trouble preparing the absorbent to be used or operating in the absence of air and other oxidizing materials. The equipment used in the process may be swept clear of air as by passing methane or other inert gas through the system. I prefer to use an absorbent of particle size 100 to 300 mesh, but the particle size may vary from 10 mesh down to 20 microns in diameter. In carrying out my process the gas velocity and particle size are correlated to give hindered settling in each of the absorbing, stripping and cooling zones.

The process of my invention has many applications. It may be used generally to separate unsaturated hydrocarbons from gaseous mixtures containing more saturated hydrocarbons. Typical separations are those wherein olefins are separated from gaseous mixtures containing close boiling paraffins and where diolefins are separated from gaseous mixtures containing close boiling olefins and paraffins. My process is particularly useful in separating the conjugated diolefin butadiene-1,3 from gaseous mixtures containing more saturated close boiling hydrocarbons, or in separating isoprene from gaseous mixtures containing more saturated close boiling hydrocarbons. It is advisable in practicing my invention to remove any cyclopentadiene or acetylene from the feed stock, since these compounds are difficult to desorb from the absorbent and operational difficulties arise. My invention can most economically be used where boiling points of the various components are so close together that ordinary fractional distillation is very costly and impractical. It is preferable to limit the separation to mixtures containing hydrocarbons having no more than five carbon atoms. Low temperatures aid the formation of the complex and the temperature in the absorbing zone should be just sufficient to keep all components in the feed in the gaseous state.

The process of my invention is completely continuous, each step of the process being carried out continuously and without interruption. This is highly advantageous over batch or intermittent processes which have been proposed heretofore.

Each of the three zones, namely the absorption zone, the stripping zone and the cooling zone, may take the form of a vertically disposed elongated substantially cylindrical vessel closed at its opposite ends. The bottom may conveniently be of conical shape to facilitate removal of absorbent settling to the bottom of the vessel. Suitable equipment for separating absorbent particles from the gaseous or light phase above the lower or dense phase, and discharging the separated gas, substantially or completely free from absorbent particles, from each zone may conveniently be provided within the upper part of each vessel. Such separating equipment preferably takes the form of a cyclone separator of known type located wholly within each zone in the top thereof and arranged to withdraw the gaseous phase in the upper portion of the zone continuously, to separate the absorbent therfrom, to discharge the resulting gas through a conduit leading outside the zone, and to return the separated absorbent through a dip leg, or standpipe, depending from the cyclone to a point well below the level of dense phase in order to form the necessary seal and prevent gas phase from blowing back up the legs, which would nullify the action of the cyclone.

The suspensions of absorbent in the feed gas, recycle product gas used for stripping, and the recycle tail gas used for cooling are introduced upwardly into the lower portions of the absorber, stripper and cooler respectively under conditions regulated to effect the desired result in each of said zones. Typically the rates of absorbent introduction and withdrawal from each of the three zones are substantially equal during normal operation of the process. However a concentration of absorbent particles considerably greater than that prevailing in the incoming suspensions is maintained in the fluid-like absorbent beds (i. e. in the dense phase) inside the three zones. This result is brought about by correlating the linear velocity of the fluid mixture upwardly through the bed, and the average weight and size of the absorbent particles, to give hindered settling of the absorbent particles in the fluid bed due to the lifting action of the upwardly moving fluid stream working oppositely to the force of gravity on the absorbent particles. Hindered settling is reduced or substantially eliminated in the upper portion of each of the three zones. If desired, this may be accentuated by providing an enlarged upper portion. There is a relatively sharp line of demarcation between the fluid bed proper, in which there is pronounced hindered settling, and a high absorbent concentration and a zone at the upper end of the reactor comprising the light phase in which hindered settling is nearly absent and absorbent concentration is greatly reduced. The lower or dense phase resembles a boiling liquid. The level of the dense phase, i. e. the interface between the dense phase and the light phase, is very pronounced and resembles the interface between a liquid and a supernatant gas or vapor.

It is highly desirable to introduce the suspensions of absorbent in gas into each of the three zones through a distributing cone located in the bottom section of the zones. Such a distributing cone is preferably substantially smaller in diameter than the zone and spaced above the bottom thereof (which is preferably conical) in order to allow settling of absorbent downwardly through the annular space, between the distributing cone and the walls of the zone into the space below the distributing cone, whence it may be withdrawn continuously as a relatively compact stream of absorbent. Such distributing cones aid greatly in the uniform distribution of the suspension over the entire area of the zones. The distributing cones may be provided across their top with foraminous means, such as perforated grids, for distributing the incoming suspension.

In each zone the degree of hindered settling, or backflow of absorbent particles, should be such as to result in thorough mixing and sufficient turbulence in the lower, or dense phase portion, of the zone to give a substantially uniform temperature distribution throughout the zone.

If desired the upper portions of the three zones, that is the absorbing, stripping and cooling zones, may be enlarged relative to the lower portion thereof in order to aid in the maintenance of hindered settling dense phase conditions in the lower portion, and to reduce greatly the amount of absorbent entrained in the light gaseous phase prevailing in the upper portions of the zones.

It will be understood that suitable provision will be made for the addition of make-up absorbent as required to compensate for system losses. Generally such make-up absorbent will be introduced in fresh condition directly to the first suspending step, wherein the suspension in the feed gas is prepared for introduction to the absorbing zone. It will also be understood that, if desired, suitable provision may be made for withdrawing a stream of the stripped absorbent continuously to a suitable regeneration unit, wherein the absorbent is treated in suitable manner to remove any contamination thereof. The thus regenerated absorbent will be recycled to the system. If the regenerated absorbent is hot it should, of course, be cooled prior to its return to the absorber. This cooling may be accomplished conveniently by recycling the regenerated absorbent to the cooling step of the system. The regeneration may conveniently be accomplished by treatment of the absorbent with inert gas, at high temperature, to remove any contaminants therefrom.

While I much prefer the hindered settling process described above, other types of fluidized contacting may be employed within the broad concept of my invention. However such other types of fluidized contacting are much less preferably because they involve too great a capital outlay for original equipment, and are undesirable in other respects, among which is the unnecessary complexity and the difficulties encountered in operation.

The temperatures at which absorption, desorption and cooling are carried out in the practice of my invention can be readily established by one skilled in the art in the light of the present disclosure and discussion. Generally speaking, I prefer to carry out the absorption at a temperature just sufficient to keep all hydrocarbons in the gaseous state. Generally the desorption is carried out at a considerably elevated temperature. The stripped absorbent is cooled in the cooling step to a temperature at which it is suitable for reintroduction to the absorption step. Since the absorption involves the liberation of heat, it may be desirable to cool the absorbent in the cooling step to a temperature below that of the incoming feed in order to compensate for such heat of absorption and consequent temperature rise. Alternatively or additionally the feed gas may be cooled prior to the suspension of the cooled absorbent therein.

For the separation of butadiene-1,3 from a gaseous mixture containing more saturated close boiling hydrocarbons the following operating conditions are recommended and preferred.

*Pressures.*—Low superatmospheric in the absorption zone.

Atmospheric or low subatmospheric in the desorption zone.

The absorption of butadiene-1,3 is aided by pressure and the desorption is hindered by pressure.

Temperatures

*Absorption zone.*—Between 35° F. and 50° F. Mixtures of hydrocarbons containing butadiene-1,3, other more saturated C₄ hydrocarbons, and minor amounts of other more saturated hydrocarbons would boil in the range from 25° F. to 30° F., hence for vapor phase absorption of the butadiene-1,3 at one atmosphere pressure or slightly higher the temperature must be above 30° F. The complex formation

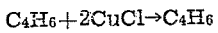

2CuCl is favored by low temperature.

*Desorption zone.*—Between 175° F. and 250° F. Temperatures in this range reverse the complex formation reaction. Since product butadiene is used as the heating medium, it is desirable to desorb at high temperatures in order to reduce the amount of butadiene lost via the desorbed absorbent.

*Cooling zone.*—Cooled tail gas should be at a temperature required to cool the hot absorbent to the temperature desired in the absorption zone. Feed gases will have little effect on this temperature since they are introduced at about the temperature desired in the absorption zone.

In the accompanying drawing the absorber, stripper and cooler are shown as combined into a single unit, the absorber 1 being at the top, the stripper 2 being immediately therebelow and the cooler 3 being at the bottom. A single cylindrical shell, which is elongated vertically, may be used to form all three zones, this single shell being divided into the three zones by partitions 4 and 5 extending thereacross. The feed enters via line 6 and at point 7 is admixed in any suitable manner with cooled stripped absorbent flowing to conduit 8 to give a suspension which is conveyed by conduit 9 into absorber 1. The means for suspending the absorbent in the stream of feed gas at point 7 may take any form known to the art. The resulting suspension is introduced upwardly in absorber 1 by distributing cone 10, forming the hindered settling dense phase in the lower portion of zone 1. The upper level of the dense phase is indicated by line 11. The absorbent which settles out passes around the distributing cone 10 and falls to the bottom of the absorbing zone, being collected as a relatively compact mass above collecting cone 12 and being withdrawn via line 13. Cyclone separator 14 is provided in the top of absorber 1, and withdraws light gaseous phase continuously through inlet 15, separates the absorbent therefrom, and discharges the resulting tail gas via line 16. The separated solid absorbent is collected in leg or standpipe 17, which depends from separator 14 to a point well below the level 11 of the dense or hindered-settling zone.

The rich solid absorbent is conveyed by a conduit 13 to a point 18 where it is suspended by any suitable means, and in any suitable manner, in a stream of heated recycle product gases entering via line 19. The resulting suspension is conveyed by a conduit 20 upwardly through distributor cone 21 located in stripping zone 2. Hindered settling conditions prevail in the lower portion of zone 2, the level of the dense phase being indicated by numeral 22. The rich absorbent is held in zone 2 for a sufficient period of time and under conditions such that the absorbed fraction is substantially completely stripped therefrom by the heat imparted thereto by the heated recycle product gas. The stripped absorbent collects as a relatively compact mass above collecting cone 23, located in the bottom of zone 2, whence it is withdrawn continuously via means 24. The light gaseous phase in the upper portion of zone 2 is continually sucked into cyclone 25 which separates the product gas substantially free of entrained absorbent and discharges same via line 26. The separated absorbent collects in the depending leg of cyclone 25 and is continuously returned thereby to a point below the dense phase level 22.

The product gas stream is split at point 27 into two streams one of which is withdrawn from the system via line 28 and the other of which is passed via line 29 through heater 30, the heated stream being employed to suspend rich absorbent prior to entry into zone 2. The recycle gas product stream may be heated in any suitable manner. I prefer however to heat it by indirect heat exchange with any suitable heating medium, such as steam.

The stripped hot absorbent is passed via means 24 and 31 to a point 32, where it is suspended in a stream of cooled recycle tail gas flowing in line 33. The resulting suspension is passed by means 34 upwardly into cooling zone 3, being distributed therein by distributing cone 35. Hindered settling conditions prevail in cooling zone 3, the level of the dense phase being indicated by numeral 36. The cooled absorbent collects in the bottom of zone 3 in collecting cone 37 and is withdrawn continuously by means 8 which conveys it to the point 7 where it is suspended in the incoming feed entering via line 6.

The light gaseous phase prevailing in the upper portion of cooling zone 3 is continuously sucked into cyclone 38 which separates the solid absorbent therefrom, discharging the resulting tail gas via line 39 and returning the solid absorbent to a point below the level 36 of the dense phase.

The tail gas discharged via line 16 from the top of absorbing zone 1 is split into two streams at point 40, one of the streams being withdrawn from the system via lines 41 and 42 and the other stream being recycled via line 43 containing cooler 44 for use in suspending the hot absorbent and for cooling same in cooling zone 3. Cooler 44 is preferably an indirect cooler, the recycle tail gas being cooled in any suitable manner as by indirect heat exchange with cooling water.

The tail gas flowing in line 39 has been heated by the hot absorbent in zone 3. It is convenient to merge the stream of tail gas in line 39 with the stream of tail gas in line 41 and to withdraw the composite stream from the system via line 42.

The light solid lines in the drawing denote the flow of gas free from absorbent. The heavy solid lines denote the flow of relatively compact absorbent and of suspensions of absorbent in gas streams.

It will be understood by those skilled in the art that the drawing is schematic only and that details of conveying means compressors, pumps, heaters, coolers, piping, T's, valves, check valves, gas seals, suspending means, etc. have been omitted from the drawing in the intereset of simplicity and more ready understanding of the invention. Such details may readily be supplied, by those skilled in the art, for any specific application of my invention.

For starting up operations, a line 29A is provided for introducing a gas stream into the product recycle line 29 during the starting up period when the amount of product gas from stripping zone 2 is zero or very small in amount. As soon as steady state operation has been instituted, the flow of such extraneous gas through line 29A may be terminated.

The gas supplied during this starting up period may be either (a) an inert gas (b) product gas from an outside source or (c) tail gas from line 16. The introduction of this gas would be discontinued as soon as the product stream reaches the volume required to supply the heat needed for desorption. However, I do not wish to exclude the possibility that inert gases may be used along with the recycle product gas for effecting stripping in zone 2, if desired, during the normal process period as well as at the start of operations.

The extraneous gas supplied via line 29A during starting up and/or during normal operation should be one that may be readily separated from the desired product, leaving via line 28, by conventional means within the skill of the art.

It is preferred that the feed gas be free from constituents which would gradually foul up the absorbent. Accordingly if the feed gas which is available contains such contaminants, it is treated before entering the system in order to remove such objectionable components.

In case absorbent contaminants get in the system, fouling up the absorbent, a take off line 24A has been provided, so that contaminated absorbent coming from the desorption zone 2 can be withdrawn. Fresh uncontaminated absorbent can be added to the system either through an inlet line 31A, entering absorbent conduit line 31, or through an inlet line 8A, entering absorbent conduit 8.

From the foregoing many advantages of my invention will be obvious to those skilled in the art. The principal advantage is that a greatly improved method of separating a gaseous mixture into two fractions is provided. Another advantage is that the equipment requirements are simple and adapted to long life. Another advantage is that the fluidized conditions employed allow enormous surface contact between the finely divided absorbent and the gases or vapors. My invention utilizes the absorbent much more completely because the available absorptive area of a given weight of finely divided absorbent is enormous compared to that of the same absorbent in the form of coarse particles. Another advantage is that my invention provides for the stripping of the rich absorbent by means of product gas itself so that no contamination whatsoever of the stripped material or of the absorbent is encountered. The heating of the rich absorbent by means of heated product gas is further advantageous since heat transfer is much improved over heating by indirect means such as steam coils. Still another advantage of my invention is that the stripped hot absorbent is cooled by a stream of cooled tail gas itself whereby excellent heat transfer is attained in the cooling zone and contamination of the cooled absorbent with the cooling agent is avoided because the cooling agent is either not absorbed to any appreciable extent or if it is absorbed it does not objectionably contaminate the absorbent.

It should be pointed out however, that, in some cases at least, the gas which is not absorbed in zone 1 (i. e. the tail gas), because of the preferential absorption of the product gas, would be absorbed to some extent in zone 3 where the concentration of product gas is very low. If this occurs, the absorbed tail gas would then be replaced by the more readily absorbed product gas when the absorbent reaches zone 1 so the net result is the same as if the tail gas were not absorbed in the cooling step, viz. the absorbent is not contaminated by an extraneous gaseous medium which might be used instead of tail gas for direct cooling of the absorbent.

Another advantage is that my invention provides a unitary process for the separation of gaseous mixtures into two fractions, each step cooperating with the rest of the process. Numerous other advantages of my invention will be apparent to those skilled in the art.

When separating an unsaturated hydrocarbon having no more than five carbon atoms from a mixture containing more saturated close boiling hydrocarbons a contact time of 10 to 30 seconds in the absorbing zone is satisfactory to give a high percentage of absorption of the desired product. The contact time in the desorption and cooling zones can vary over a wide range, the necessary heating and cooling being regulated by the temperature and amount of the product stripping gas and cooling recycled tail gas respectively.

Advantages of this invention are illustrated by the following example. The reactants, and their proportions, and other specific ingredients are presented as being typical and should not be construed to limit the invention unduly.

*Example*

A hydrocarbon mixture produced by the catalytic dehydrogenation of butenes and having the composition (in parts by volume):

| | |
|---|---|
| Butadiene-1,3 | 20 |
| Butenes | 64 |
| $C_2$–$C_4$ paraffins | 8 |
| $C_2$ and olefins | 4 |
| Methane and lighter | 4 |
| | 100 | is passed into an absorption zone in contact with a solid 200 mesh cuprous chloride absorbent.

The flow of feed and absorbent are adjusted so as to provide a contact time of about 20 seconds at 40° F. The cuprous chloride-butadiene-1,3 complex is continuously withdrawn from the absorption zone and passed to a desorption zone in contact with a heated stream of product butadiene at a temperature of 200° F. Described butadiene having a purity of 99.5% is withdrawn from the top of this desorption zone, while cuprous chloride substantially free from the diolefin complex is withdrawn from the bottom thereof and passed to a cooling zone. There it is contacted with a stream of the unabsorbed tail gas from the absorption zone at a temperature of about 40° F.

As will be evident to those skilled in the art, various modifications of this invention can be made, or followed, in the light of the foregoing disclosure and discussion, without departing from the spirit or scope of the disclosure or from the scope of the claims.

I claim:

1. An absorption process for effecting the separation of an unsaturated hydrocarbon containing not more than five carbon atoms from a gaseous mixture containing the same together with close boiling more saturated hydrocarbons said mixture being free of cyclopentadiene and acetylenes, which comprises the following steps: suspending in said mixture in an absorbing zone at least one finely divided, solid cuprous halide absorbent under conditions such as to effect absorption of unsaturated hydrocarbon from said mixture by said absorbent; separating the resulting rich solid absorbent from unabsorbed tail gas; suspending said rich absorbent in a heated stream of stripped product gas in a separate stripping zone under conditions such as to effect desorption of absorbed material from said rich absorbent and merger of desorbed material with said stripped product gas; separating resulting stripped absorbent from resulting product gas; cooling said stripped absorbent by suspending same in a cooled recycle stream of said unabsorbed tail gas under conditions such as to effect cooling of said absorbent; separating resulting cooled absorbent and recycling same to said absorbing zone; and withdrawing product gas.

2. The process of claim 1 wherein the absorbent is at least one finely divided solid cuprous halide supported on an inert material.

3. A chemical absorption process for effecting the separation of a diolefin containing not more than five carbon atoms from a gaseous mixture containing the same together with close boiling more saturated hydrocarbons said mixture being free of cyclopentadiene and acetylenes, which comprises the following steps: suspending solid grains of an absorbent, of size between 10 mesh down to 20 microns in diameter comprising at least one cuprous halide supported on an inert material, in said mixture in an absorbing zone under conditions such as to effect absorption of said diolefins from said mixture by said absorbent; separating resulting rich absorbent from unabsorbed tail gas; suspending said rich absorbent in a heated stream of stripped product gas in a separate stripping zone under conditions such as to effect desorption of absorbed material from the rich absorbent and merger of desorbed material with said stripped product gas; separating resulting stripped absorbent from resulting product gas; cooling said stripped absorbent by suspending same in a cooled recycle stream of said unabsorbed tail gas under conditions such as to effect cooling of said absorbent; separating resulting cooled absorbent and recycling same to said first-named step; withdrawing unabsorbed tail gas from the system; and withdrawing said resulting product gas from the system.

4. The process of claim 3 wherein the diolefin separated is butadiene-1,3 and wherein the absorbent is cuprous chloride supported on an inert material.

5. The process of claim 3 wherein the absorbent is cuprous chloride supported on an inert material.

6. The process of claim 3 wherein the diolefin separated is isoprene and the absorbent is cuprous chloride supported on an inert material.

7. The process of claim 3 wherein the diolefin to be separated is butadiene-1,3 and wherein the absorbent is cuprous bromide supported on an inert material.

8. The process of claim 3 wherein the diolefin to be separated is butadiene-1,3 and the absorbent is cuprous chloride supported on bauxite.

9. The process of claim 3 wherein the diolefin to be separated is a conjugated diolefin containing not more than 5 carbon atoms and wherein the absorbent is cuprous chloride supported on bauxite.

SAM P. ROBINSON.

REFERENCES CITED

The following references are of record in the file of this patent:

UNITED STATES PATENTS

| Number | Name | Date |
|---|---|---|
| 2,386,200 | Drennan | Oct. 9, 1945 |
| 2,386,379 | Wolk | Oct. 9, 1945 |
| 2,386,734 | Wolk | Oct. 9, 1945 |
| 2,446,076 | Campbell et al. | July 27, 1948 |